United States Patent
Gryp et al.

(10) Patent No.: US 7,556,233 B2
(45) Date of Patent: Jul. 7, 2009

(54) DUAL TRACK SEAT ADJUSTMENT APPARATUS

(75) Inventors: Dennis Gryp, East Moline, IL (US); Ryan Morris, Bettendorf, IA (US)

(73) Assignee: Sears Manufacturing Co., Davenport, IA (US)

(*) Notice: Subject to any disclaimer, the term of this patent is extended or adjusted under 35 U.S.C. 154(b) by 1081 days.

(21) Appl. No.: 10/423,468

(22) Filed: Apr. 24, 2003

(65) Prior Publication Data
US 2004/0211873 A1 Oct. 28, 2004

(51) Int. Cl.
*F16M 13/00* (2006.01)

(52) U.S. Cl. ............ 248/419; 248/429; 297/344.1

(58) Field of Classification Search ............ 248/429, 248/424, 425, 419, 420; 297/344.1, 344.11, 297/346
See application file for complete search history.

(56) References Cited

U.S. PATENT DOCUMENTS

| | | | | |
|---|---|---|---|---|
| 3,608,855 A | * | 9/1971 | Osenberg | 248/567 |
| 4,350,317 A | * | 9/1982 | Aondetto | 248/588 |
| 4,448,386 A | * | 5/1984 | Moorhouse et al. | 248/564 |
| 4,961,559 A | * | 10/1990 | Raymor | 248/429 |
| 5,014,960 A | * | 5/1991 | Kimura | 248/602 |
| 5,076,529 A | | 12/1991 | Dove et al. | |
| 5,234,189 A | * | 8/1993 | Myers | 248/429 |
| 5,286,076 A | * | 2/1994 | DeVoss et al. | 296/65.14 |
| 5,348,261 A | * | 9/1994 | Nini | 248/430 |
| 5,584,460 A | * | 12/1996 | Ropp | 248/423 |
| 5,720,462 A | * | 2/1998 | Brodersen | 248/425 |
| 5,765,802 A | * | 6/1998 | Bostrom et al. | 248/575 |
| 6,135,412 A | * | 10/2000 | Buehler | 248/421 |
| 6,349,914 B1 | * | 2/2002 | Yoshida et al. | 248/429 |

FOREIGN PATENT DOCUMENTS

| | | | |
|---|---|---|---|
| GB | 1380855 A | 1/1975 |
| GB | 1441272 A | 6/1976 |
| GB | 1594256 A | 7/1981 |
| GB | 2074442 A | 11/1981 |

OTHER PUBLICATIONS

GB Search Report Jul. 5, 2004.

* cited by examiner

*Primary Examiner*—J. Allen Shriver
*Assistant Examiner*—Steven Marsh
(74) *Attorney, Agent, or Firm*—Niro, Scavone, Haller & Niro

(57) ABSTRACT

A fore and aft vehicle seat adjustment apparatus comprising a base having a plurality of opposingly located tracks disposed thereon. Also provided is a fore and aft adjustment apparatus in communication with the base. The adjustment apparatus includes a first member connected to an opposingly located second member. The first member is positionable with respect to the second member between a first and second position. The first member also includes a plurality of locking mechanisms which are adapted to releasably engage the tracks. In the first position, the locking mechanisms engage the tracks to lock the seat in position. In the second position, the locking mechanisms are disengaged from the tracks to permit fore and aft adjustment of the seat.

6 Claims, 3 Drawing Sheets

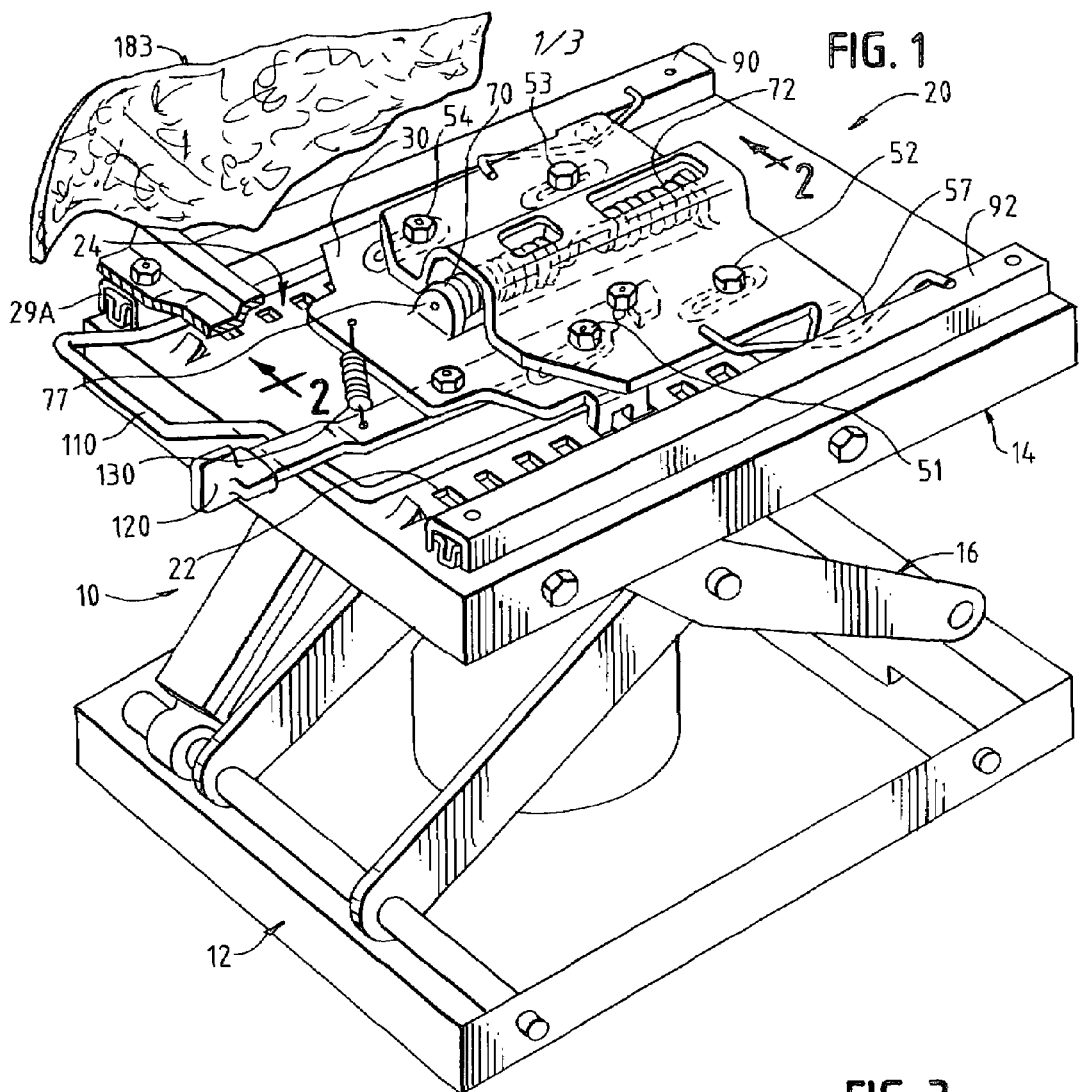
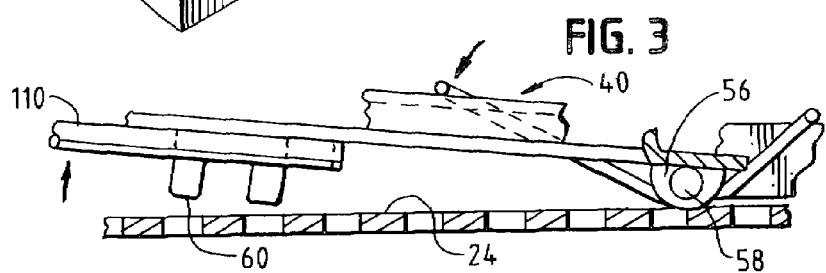
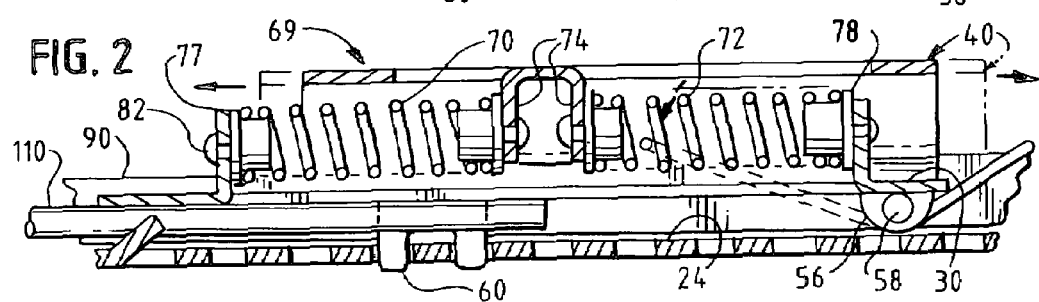

DUAL TRACK SEAT ADJUSTMENT APPARATUS

BACKGROUND OF THE INVENTION

The present invention relates to a system for use in a seat suspension that increases the stability of a seat. More specifically, the present invention concerns a dual track seat adjustment apparatus.

SUMMARY OF THE INVENTION

In most seat suspension systems, a subsystem is provided to make fore and aft adjustments to the seat. These adjustment systems often only employ a single track located along one edge of a base to lock the seat into position. However, the use of a single locking track has certain drawbacks. For example, when a single locking track system is subjected to an outside force, the system has a tendency to twist around the single track. This torsion not only puts unnecessary strain on the suspension, it also puts unnecessary strain on a user as well.

The present invention overcomes these disadvantages by providing a seat adjustment system that has dual locking tracks. Use of the dual locking tracks minimizes undesirable torsion in the suspension and provides a more comfortable ride.

DESCRIPTION OF THE DRAWINGS

These and other features, objects and advantages of the present invention will become apparent from the following description and drawings wherein like reference numerals represent like elements in several views, and in which:

FIG. 1 is a perspective view of one embodiment of the present invention with portions removed to reveal various aspects of the invention.

FIG. 2 is a partial cross-sectional view taken along line 2-2, showing the lock in an engaged position.

FIG. 3 is a partial cross-sectional view taken along line 2-2, showing the lock in a disengaged position.

DESCRIPTION OF THE PREFERRED EMBODIMENTS

Figure 4:
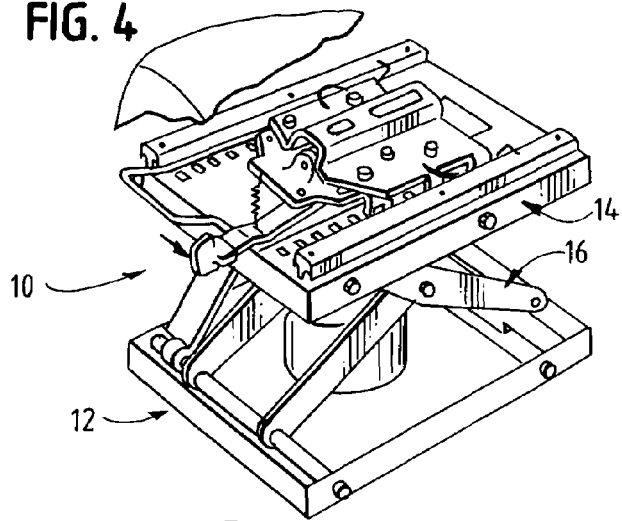
FIG. 4 is a perspective view of the embodiment shown in FIG. 1.

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

As shown in FIGS. 1-6, one embodiment of the present invention consists of a seat suspension 10 having a first base 12 and a second base 14 with a suspension 16 disposed there between. The suspension shown is a scissors type of assembly but other suspensions or dampeners known to those of skill in the art may be used as well.

A fore and aft adjustment apparatus 20 is also included which is in communication with base 14. The adjustment apparatus 20 coacts with a pair of opposing tracks 22 and 24 which are shown as a plurality of cut-outs in base 14. While cut-outs are shown, a plurality of depressions or raised portions may be used as well so long as the structure interlocks or meshes with a locking mechanism as will be explained in further detail below.

Adjustment apparatus 20 includes a first plate or member 30 having plurality of elongated apertures, holes or channels 31-34. A second plate or member 40 is also provided which includes a plurality of apertures 41-44 which align with apertures 31-34. Fasteners 51-54 connect members 30 and 40 together. Fasteners 51-54 may include, but are not limited to, coacting threaded fasteners, rivets, pins, rods, as well as other structural elements known to those of ordinary skill in the art which are used to link structural elements together.

Member 40 also includes flanges or arms 55 and 56 which are connected to sliders 90 and 92 by pins 57 and 58.

Locking mechanisms 60 and 62 are also provided as shown in FIGS. 2-4. The locking mechanisms are constructed to interlock with dual tracks 22 and 24. As shown in a preferred embodiment, the locking mechanisms are constructed as projections such as prongs or claws which releasably interlock with the apertures forming the opposing tracks 22 and 24. Of course, other releasable interlocking designs may be used as well such as intermeshing teeth and the like.

To provide fore and aft dampening, a dampener 69 is provided. Dampener 69 includes springs 70 and 72 which are disposed between members 30 and 40, and separated by a divider 74. Flanges 77 and 78 on member 30 secure the springs in place along with spring retainer 82.

An aperture 80 on member 40 receives divider 74. This connection between divider 74 and aperture 80 as well as flanges 77 and 78 provide the necessary fixed points which the springs act against. In addition, the elongated nature of aperture 31-33 permit the fasteners to move there within so as to allow dampener 69 to function.

Member 40 is also constructed with a raised portion 84. This creates extra space which allows a substantial portion of dampener 69 to be covered by or housed within member 40.

Also provided is a pair of oppositely located gliders or slides 90 and 92 which provide smooth fore and aft movement. Adjustment apparatus 20 is linked to the slides 90 and 92 as described above.

Figure 6:
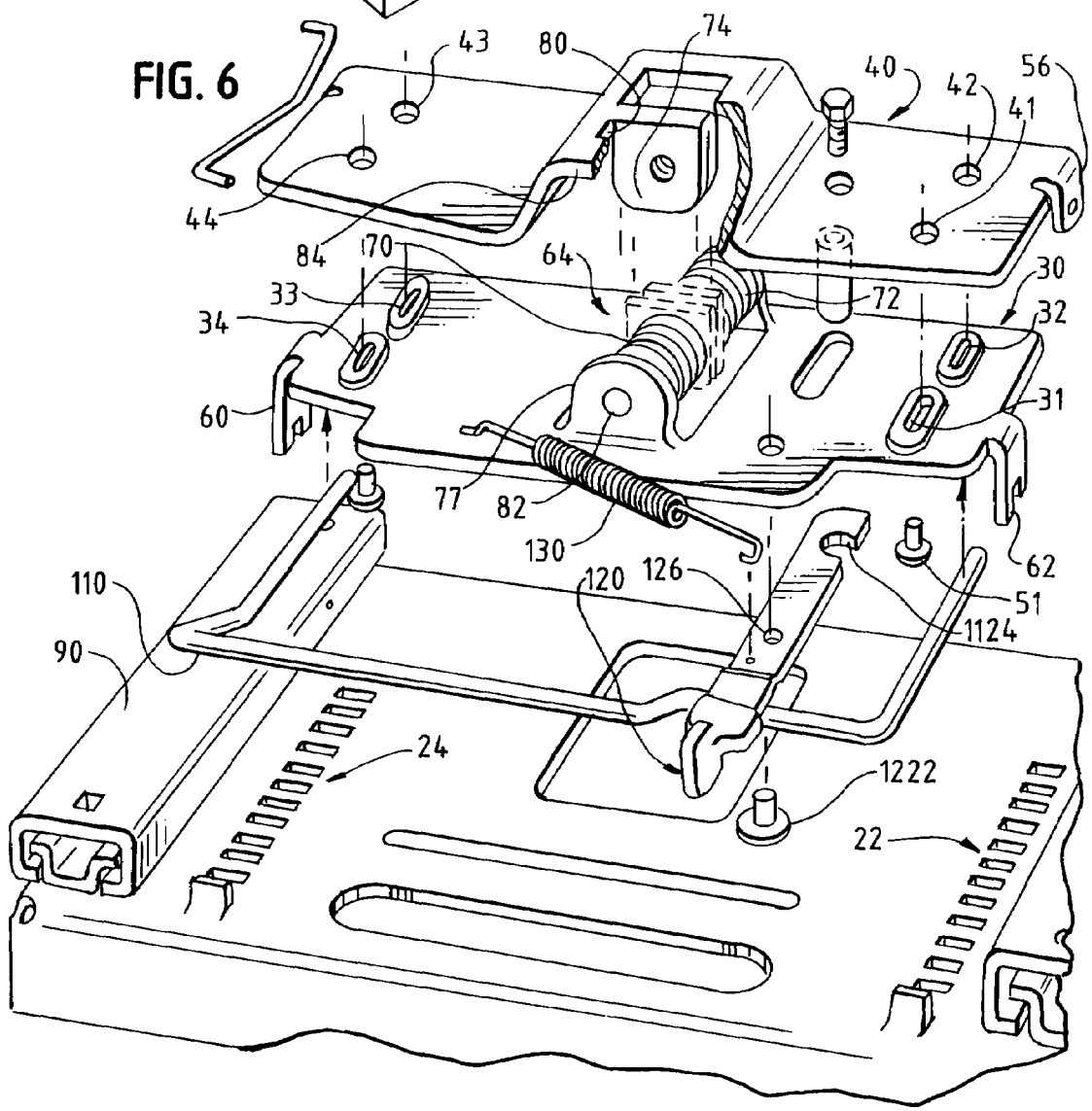
FIG. 6 is an exploded perspective view of the embodiment shown in FIG. 1.

A lift bar 110 is further provided as shown in FIG. 6 which coacts with member 30. In addition, an isolator lock 120 is pivotally connected to member 30 by fastener 1222. Adjustment lock further includes a notch 1124 which is spaced apart from the pivot point 126. Notch 1124 is adapted to engage a fastener or stud 151. Spring 130 biases lock 120 in a locked position.

Figure 5:
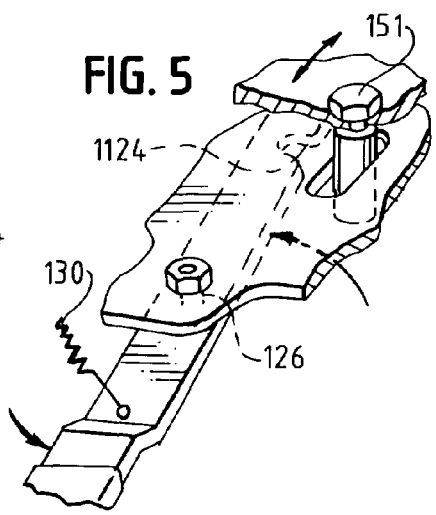
FIG. 5 is a partial perspective view of a fore/aft adjustment lock which may be used with the present invention.

In use, as shown in FIGS. 3 and 5, when the seat is positioned in the desired fore/aft position, locking members 60 and 62 are interconnected to tracks 22 and 24. This interaction locks the seat in position. As mentioned above, dampening is provided by dampener 69, when lock 120 is unlocked through the disengagement of notch 1124 with stud 151.

When a positional change is desired, bar 110 is lifted. This action lifts members 30 and 40 from a first position by a pivoting movement on pins 57 and 58. This results in locking members 60 and 62 being moved out of tracks 22 and 24 and into the second unlocked position. This permits the seat assembly to then be moved fore and aft using the sliders. Once in a proper position, bar 110 is lowered which causes locking members to coact with the tracks to hold the seat in the desired position.

Figure 7:
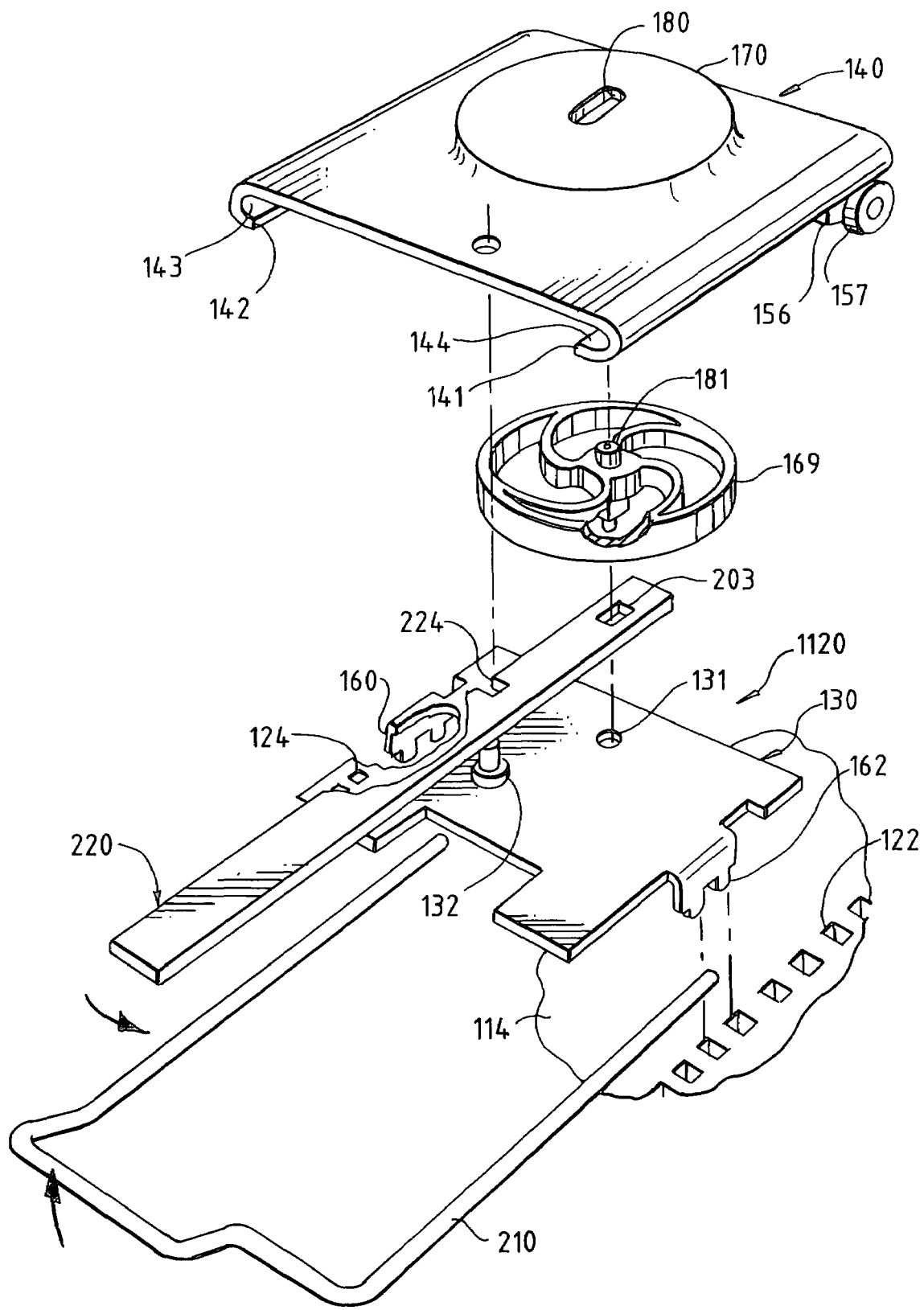
FIG. 7 is an exploded perspective view of an alternate embodiment of the present invention.

FIG. 7 shows an alternate embodiment of the present. This embodiment is similar in construction to the embodiment described above but includes some differences in construction due to the use of a different type of dampener. As shown, this embodiment of the present invention includes a base 114 which is similar in construction to base 14. A fore and aft adjustment apparatus 1120 is also included which is in communication with base 114. The adjustment apparatus 1120 includes a pair of opposing tracks 122 and 124 which are shown as a plurality of cut-outs in base 114. While cut-outs are shown, a plurality of depressions or raised portions may be used as well so long as the structure interlocks with a locking mechanism as explained above.

Adjustment apparatus 1120 includes a first plate 130 having an aperture 131 and a stud or pin 132. A second plate 140 is also provided which includes curled edges 141 and 142 which form channels 143 and 144. The channels are sized and adapted to receive the edges of member 130.

Member 140 also includes flanges or arms 156 to which pins are connected so as to couple member 140 to sliders as described above.

Locking mechanisms 160 and 162 are also provided as shown in FIG. 7. The locking mechanisms are constructed to interlock with tracks 122 and 124. As shown in a preferred embodiment, the locking mechanisms are constructed as projections such as a prong or claw which releasably interlock with the apertures forming the opposing tracks. Of course, other releasable interlocking designs may be used as well such as intermeshing teeth and the like.

To provide fore and aft dampening, a dampener 169 is provided. Dampener 169 is a deformable material the design of which is disclosed in pending U.S. application Ser. No. 09/884,891, which is specifically incorporated herein by reference. The dampener 169 is designed to resist force that is applied to it in a controlled manner so as to provide the desired dampening.

An aperture 180 on plate 140 receives a pin 181 which secures dampener in a fixed position by also engaging aperture 131. This connection between pin 181 and the apertures in members 130 and 140 provides the necessary fixed point which the dampener acts against.

Member 140 is also constructed with a raised portion 170. This creates extra space which allows a substantial portion of dampener 169 to be covered by or housed within member 140.

A lift bar 210 is further provided. In addition, a lock 220 is pivotally connected to member 130 by pin 131 which extends through aperture 203. The lock 220 further includes a notch 224 which is spaced apart from the pivot point formed at pin 131. Notch 224 is adapted to engage a fastener or stud 132. When notch 224 is engaged with component 132 the dampening function is disabled.

In use, this embodiments works in a similar manner as the first embodiment. When in the desired fore/aft position, locking members 160 and 162 are interconnected to tracks 122 and 124. This interaction locks the seat in position. As mentioned above, dampening is provided by dampener 169.

When a positional change is desired, bar 210 is lifted from a first position into a second position where locking members 160 and 162 are disengaged from tracks 122 and 124. While member 130 is in the second position, fore or aft adjustments may be made and the seat locked into position by lowering handle 210 until the locking members 160 and 162 re-engage tracks 122-124 (the first position).

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A fore and aft vehicle seat adjustment apparatus comprising:
a base having a plurality of opposingly located tracks disposed thereon;
a fore and aft adjustment mechanism in communication with said base, said adjustment mechanism including first and second plate members, said plate members being horizontally movable relative to the base and relative to one another;
said first plate member being positionable with respect to said base between a first and second position; and
said first plate member including a plurality of locking mechanisms, said locking mechanisms adapted to releasably engage said tracks, so that with said first plate member in said first position, said locking mechanisms engage said tracks and lock said first plate member in fixed location relative to the base, and, in said second position, said locking mechanisms are disengaged from said tracks to permit fore and aft adjustment of said first plate member relative to the base.

2. The apparatus of claim 1 further including a pair of slide members, said second plate member being connected to the slide members to permit horizontal movement of the second plate member relative to both the base and first plate member.

3. The apparatus of claim 1 further including a dampener for developing a biasing force to resist movement of the second plate member relative to the first plate member.

4. The apparatus of claim 3 wherein said dampener comprises two compression springs disposed between the first and second plate members.

5. The apparatus of claim 3 wherein the dampener comprises a deformable material.

6. The apparatus of claim 1 further including a lift rod connected to said first plate member to move the first plate member from the first position to the second position.

* * * * *